Patented July 28, 1942

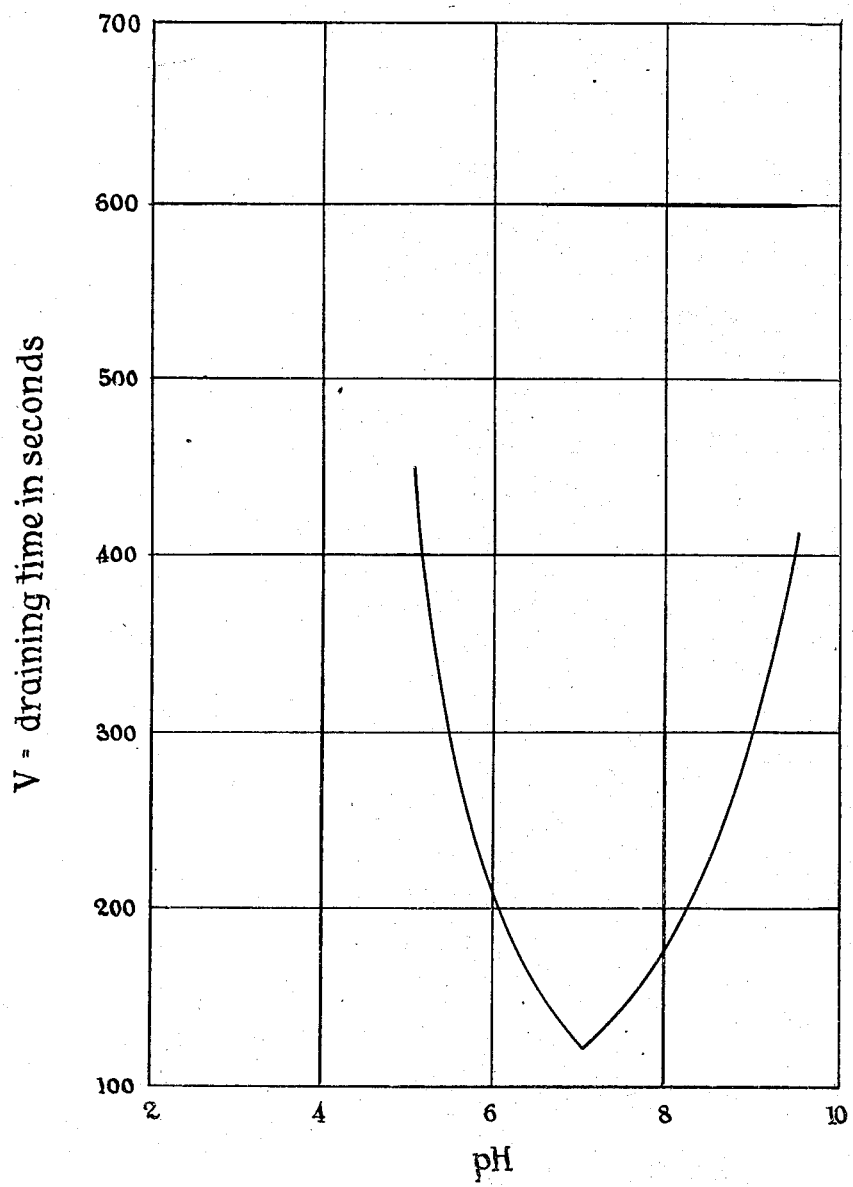

2,291,041

UNITED STATES PATENT OFFICE 2,291,041

METHOD OF MAKING STARCH SOLUTIONS

Hans O. Kauffmann, Eggertsville, Paul H. Margulies, Kenmore, and Joseph R. Ryan, Buffalo, N. Y., assignors to Buffalo Electro-Chemical Company, Inc., Buffalo, N. Y.

Application April 13, 1940, Serial No. 329,442

2 Claims. (Cl. 127—33)

This invention relates to a method of liquefying or solubilizing starch by treating natural or raw starch with a peroxide.

For many uses of starch it has been found necessary heretofore to change raw starch into the so-called soluble condition in order to obtain the best result in the industrial application of the starch. These treatments were generally known as solubilizing or liquefying treatments.

The starch was solubilized or liquefied generally by subjecting the same to enzymatic action. This action had to be effected under closely controlled conditions of concentration of enzyme, temperature, acidity and time of treatment to prevent too great a degradation of the starch since in many instances, it is desired to produce only liquefied starch and not lower degradation products, as, for instance, sugar. Even under rigid control, reproducible results were the exception rather than the rule.

Recently it has been suggested that soluble modifications of starch be produced by subjecting the starch to the action of salts of persulfuric acid, it being pointed out that other percompounds and peroxides are not adapted for solubilizing starch except by the utilization of large quantities of material and then only with the production of a material of indifferent quality.

The present invention provides a method of solubilizing starch in which the course of the solubilizing action can be reproducibly controlled and in which the end product is contaminated with a minimum of lower degradation products and of extraneous materials. The invention provides a method whereby liquefied starch of reproducible desired properties can be prepared by a chemical action as contrasted with difficultly controllable biological action.

The method also provides a means for producing liquefied starch solutions of controlled and predetermined viscosity.

Other incidents and advantages of the invention will be pointed out hereinafter and set forth with particularity in the claims appended hereto.

In accordance with the procedures of the present invention, raw starch of any suitable origin is treated with the specific liquefying agent at elevated temperatures. A thorough mixture of starch and liquefying agent is, however, accomplished at room temperature where practically no reaction between the starch and liquefying agent takes place. In contrast with the chemical action contemplated by this invention, enzymes begin to act at lower temperatures and therefore localized reactions will take place even before the bulk of the starch is well mixed with the enzyme. Furthermore, the range of the enzymatic reaction increases with increase of enzyme concentration. In the present invention, depending upon the quantity of the liquefying agent, substantially any desired degree of viscosity can be obtained, as the resultant viscosity is substantially a linear function of the amount of chemical liquefying agent employed; furthermore only liquefied starch is the result.

The solubilizing treatment is preferably performed in aqueous solution at the desired concentration of starch, even up to 50% or more of starch and in such a manner that the final solution possesses a pH of about pH 6.5 to pH 7.5, this being the optimal pH range. At both lower and higher pH's the liquefying action is very considerably inhibited.

The specific liquefying agent used is a peroxide or an addition compound of a peroxide. The alkali metal peroxides, hydrogen peroxide and addition materials of peroxide to carbonates, borates, phosphates, and the like, are all found suitable, and starch solutions of excellent properties can be prepared therefrom provided the final or end pH of the solution is within the range of about pH 6.5 to pH 7.5. Where hydrogen peroxide is employed, the preferred alkali for controlling the end pH is sodium carbonate, although other mild alkalies such as borax, pyrophosphate, sodium silicate, and the like, may be employed.

The temperature of treatment is relatively high and the treatment should be carried out at a temperature preferably higher than the gelatinization point of the starch treated. The starch is treated at such temperature for a period of about 10–40 minutes or until the desired solubility and viscosity are obtained. The temperature for the most effective treatment is about 90 to 100° C., and should be reached as rapidly as possible. Generally, therefore, the starch should be heated in a good conducting vessel or with live steam.

As a specific example purely illustrative but not limitative of the invention, 0.3 cc. of 100 volume hydrogen peroxide and 0.2 gram of sodium carbonate were dissolved in 1 liter of water and thereafter 100 grams tapioca starch added and the whole stirred until uniform wetting and mixing was obtained. The mixture was then heated rapidly with live steam to 90° C. and maintained at or above 90° C. for about one-half hour. At the end of the heating period the starch was fully solubilized and a test with iodine produced a characteristic blue untinted with violet or red. A test did not disclose the presence of any appreciable amount of reducing substance. The pH of the solution was 6.8.

In the drawing there is shown a graph obtained by plotting draining time of a starch solution of a given concentration from a tube of given diameter, length and orifice against the final pH of the solution.

Referring to the drawing, it will be seen that with a given quantity of hydrogen peroxide, given quantities of starch in the same amount of water will liquefy to produce products of quite different viscosities. Thus if the pH be about 5, the viscosity (draining time in seconds) will be about 500 seconds which figure will be found to be about 120 seconds at pH 7. As stated in the prior art, very large quantities of hydrogen peroxide at pH 5 would be required to change the viscosity from 500 seconds to 120 seconds.

Where high mobility in the starch solution is required the use of hydrogen peroxide as a liquefying agent, therefore, was not suitable as reproducible results could not be obtained nor was a procedure afforded that was as safe as the enzyme action.

Ten percent starch solutions were prepared and treated with hydrogen peroxide and sodium borate in amounts sufficient to liquefy the starch and to produce the end pH shown. The starch was liquefied in accordance with the directions outlined above and the draining time determined by placing in a standard viscosimeter tube and the draining time determined in seconds. It will be noted that with pH's far removed from the pH 6.5 to 7.5 the viscosity of the starch increases at a relatively high rate. The minimum viscosity will be obtained independently of the concentration of the original starch solution provided the final pH be at the optimum. With an end pH of about 8.5 the draining time was 450 seconds, while with a pH of 7.5 the draining time was 150 seconds.

For industrial purposes the low viscosity material only is suitable since in general the starch must be capable of ready flow, application and penetration, particularly when it is used for the sizing for textile fibers.

What is claimed is:

1. The method of liquefying starch which comprises mixing a starch suspension and a reagent consisting of hydrogen peroxide and sufficient sodium carbonate to adjust the mixture to a final pH of 6.5 to 7.5 and heating the mixture to a temperature above the gelatinization point of the starch until the starch is liquefied.

2. The method of liquefying starch which comprises mixing a starch suspension and a reagent consisting of hydrogen peroxide and sufficient mild alkali to adjust the mixture to a final pH of 6.5 to 7.5 and heating the mixture to a temperature of 90° C. to 100° C. until the starch is liquefied.

HANS O. KAUFFMANN.
PAUL H. MARGULIES.
JOSEPH R. RYAN.